March 22, 1938.   R. N. ROWE   2,111,939
ELECTRICAL CONNECTER
Filed March 23, 1935
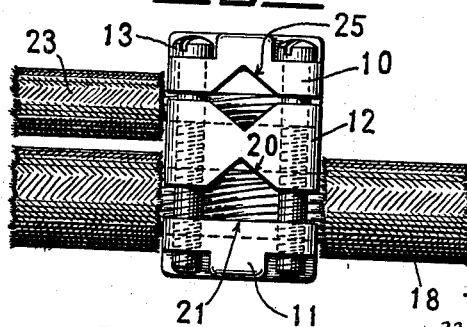
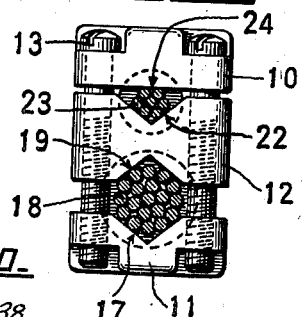
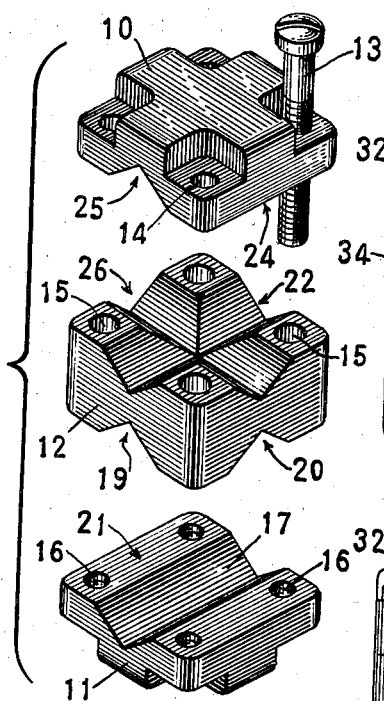
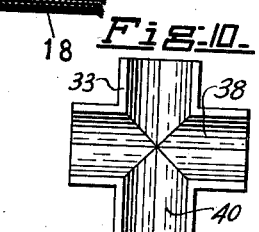
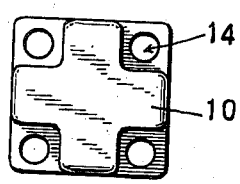
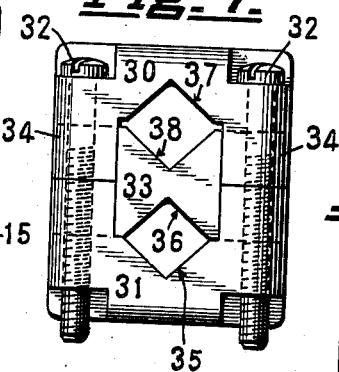
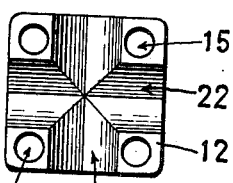
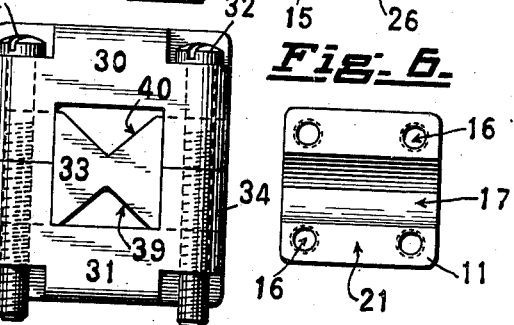
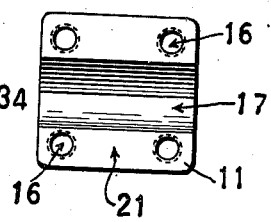
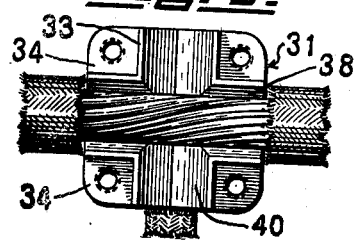
INVENTOR
RAYMOND N. ROWE,
BY
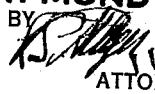
ATTORNEY Patented Mar. 22, 1938

2,111,939

UNITED STATES PATENT OFFICE 2,111,939

ELECTRICAL CONNECTER

Raymond N. Rowe, Plainville, Conn., assignor to The Trumbull Electric Manufacturing Company, Plainville, Conn., a corporation of Connecticut Application March 23, 1935, Serial No. 12,553

7 Claims. (Cl. 173—273)

My invention relates to devices intended particularly to connect two electrical cables without the use of solder.

One object is to provide a construction by means of which the end of one cable may be attached to any part of another cable.

Another object is to provide a construction by means of which two cables may be connected together in either parallel or right angle relation.

In the form shown in the drawing the device consists of three parts connected together by a number of screws or bolts and having between them grooves adapted to receive the cables. Two forms of the device are shown, in one of which one of the parts is interposed between the other two and the connecting screws pass through all three parts. In the other form the central part is guided between the other two parts.

Fig. 1 is a side view of one form of device showing the cables connected in parallel relation.

Fig. 2 is an end view of the same device but showing the cables in section.

Fig. 3 is a perspective view of the parts of the device of Figs. 1 and 2.

Figs. 4, 5, and 6 are plan views of the separate parts of the same device.

Figs. 7 and 8 are side views taken at right angles to each other of a modified form of device.

Fig. 9 is a plan view of the modification showing one of the parts removed with the cables connected at right angles.

Fig. 10 is a plan view of the intermediate clamping member of the form shown in Figs. 7 to 9.

The three main parts of the device 10, 11 and 12 may be formed of any suitable metal and drawn together by screws 13 which pass freely through holes 14 and 15 and screw into the seats 16.

The lower part 11 has a groove 17 adapted to receive the cable 18. The central part 12 has a groove 19 adapted to fit the cable. This part 12 also has a groove 20 at right angles to the groove 19 which is adapted to fit a cable at right angles to the position shown in Fig. 1. The part 11 has no groove at the point 21 so that the space left for a cable in the groove 20 will accommodate a smaller sized cable.

The part 12 also has another groove 22 parallel to the groove 19 adapted to receive a cable 23. The top piece 10 has a wall 24 adapted to clamp down on the top of the cable 23 above the groove 22.

This top piece 10 also has a groove 25 at right angles to the groove 22 and parallel to the groove 26 in the center piece so as to accommodate a cable at right angles to the cable 23 shown in Fig. 1.

These parts 10, 11, and 12 are all made symmetrical about a central axis so that they may be interchanged to accommodate various sizes and angular relations of cables. When the parts are applied to the cables the screws 13 are tightened so as to provide a very powerful clamping action on the strands of the cables.

In the form shown in Figs. 7, 8, and 9, the body of the device is made up of two parts 30 and 31 which are drawn together by screws 32. The central piece 33 is in the form of a cross which is guided between the corner portions 34 of the upper and lower parts. The lower part 31 is provided with a groove 35 and the part 33 provided with a corresponding groove 36. The upper part is provided with a groove 37 and the central part with a corresponding groove 38 so that parallel cables may be connected. The central part is also provided with grooves 39 and 40 to accommodate cables of smaller diameter at right angles to the grooves 35 and 37. The method of connection of this form of device will be clearly understood from the foregoing.

In each form of device it will be seen that there is a rectangular top plate and a rectangular bottom plate with an intervening member so constructed that cables parallel to each other or at right angles to each other may be firmly mechanically and electrically connected without the use of solder.

I claim:

1. An electrical connecter including a two part body portion, each part being formed with openings extending at right angles to each other, the openings in each part being in alignment and forming a chamber and the two parts of the body meeting in a central plane, a clamping member adjustably mounted in the chamber, said clamping member having V-shaped grooves formed therein in alignment with the openings in the body parts whereby cables may be held in right angled relationship and means for fastening the parts together.

2. An electrical connecter including two end clamp pieces and an intervening central clamp member, said end clamp pieces being provided with lugs on each of four corners thereof, the lugs on one end clamp piece extending toward corresponding lugs on the other end clamp piece, said central clamp member having four arms each guided between adjacent lugs of the end pieces, and screws connecting the adjacent corners of the end pieces, the end pieces and the central member having grooves in their opposed faces for positioning cable portions therein.

3. A cable connecter including two square end pieces with lugs at their corners, the lugs on each piece projecting toward the lugs on the other piece and forming a chamber between the pieces and their lugs, a cross-shaped intermediate clamp piece having arms guided to slide between the corner lugs of the end pieces and clamp screws passing through the corners of the end pieces and their respective lugs for drawing the end pieces toward each other and clamping conductors inserted between the end pieces and the intermediate clamp piece.

4. An electrical connecter including two end pieces and a central piece providing two recessed wire receiving paths mutually bisecting at substantially right angles between the central piece and the inner face of each end piece, one of each of said two paths on the end pieces being recessed to a depth greater than the other, the central piece having two substantially similar wire receiving grooves mutually bisecting at substantially right angles on each of the faces of said central piece adjacent an end piece, means for aligning said pieces so that the paths on the end pieces align and may cooperate with the grooves on the central piece and for selectively positioning said end pieces so that the deeper paths may lie in different planes and in either the same direction or at substantially right angles to each other, and means for drawing said end pieces toward each other and toward the central piece whereby wires of various sizes may be clamped in said paths in either parallel or crossed relation, the central piece being movable between the end pieces, and the means for aligning said pieces being arranged at uniform distances from the central axis of the pieces.

5. An electrical connecter including two end pieces, a central piece between the two end pieces and having on each face thereof adjacent an end piece grooves arranged at substantially right angles and bisecting in the central portion of each face of said central piece, a multi-part clamping means for drawing the end pieces toward each other with a central piece therebetween, each part of said clamping means being located at substantially the same distance from a central axis through said pieces and spaced substantially equi-distantly from each side of a central piece groove, guide means to direct movement of said central piece with respect to either end piece whereby a conductor may be clamped between one end piece and the central piece in a different plane from and either parallel or substantially at right angles to a conductor which may be clamped between the other end piece and said central piece.

6. An electrical connecter including two end pieces and a central piece providing two wire receiving paths mutually bisecting at substantially right angles between the central piece and the inner face of each end piece, one of said paths on each end piece having a groove therein, the other path being flat-surfaced except where the groove intersects it, the central piece having two wire receiving grooves mutually bisecting at right angles on each of the faces of said central piece adjacent an end piece, means for aligning the grooves on the end pieces with the grooves on the central piece and for selectively positioning said pieces so that the grooved paths in the end pieces may lie in different planes and in either the same direction or at substantially right angles to each other, and means for drawing said end pieces toward each other and toward the central piece whereby wires of various sizes may be clamped by said paths in either parallel or crossed relation, said aligning and positioning means and said drawing means including a plurality of screw bolts operatively engaging the end pieces, said central piece being free to slide longitudinally of said screw bolts and position itself between said end pieces, each end piece being reenforced in thickness on the outside and substantially across at least the grooved path therein.

7. An electrical connecter including two end pieces, a central piece between the two end pieces and having on each face thereof adjacent an end piece grooves arranged at substantially right angles and bisecting in the central portion of each face of said central piece, a multi-part clamping means for drawing the end pieces toward each other with the central piece therebetween, each part of said clamping means being located at substantially the same distance from a central axis through said pieces and spaced substantially equi-distantly from each side of a central piece groove, guide means to direct movement of said central piece with respect to either end piece whereby a conductor may be clamped between one end piece and the central piece in a different plane from and either parallel or substantially at right angles to a conductor which may be clamped between the other end piece and said central piece, at least one of the end pieces having projections extending toward the other end piece and constituting at least a part of said guide means for the central piece, said clamping means extending through said projections, and said central piece having recessed corner portions to receive and be guided by said projections, said central piece being of cross shape.

RAYMOND N. ROWE.